United States Patent
Guo et al.

(10) Patent No.: US 11,195,332 B2
(45) Date of Patent: Dec. 7, 2021

(54) INFORMATION INTERACTION METHOD BASED ON VIRTUAL SPACE SCENE, COMPUTER EQUIPMENT AND COMPUTER-READABLE STORAGE MEDIUM

(71) Applicant: Tencent Technology (Shenzhen) Company Limited, Shenzhen (CN)

(72) Inventors: Jinhui Guo, Shenzhen (CN); Bin Li, Shenzhen (CN); Zhiwen Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/780,742

(22) Filed: Feb. 3, 2020

(65) Prior Publication Data
US 2020/0175760 A1    Jun. 4, 2020

Related U.S. Application Data

(63) Continuation of application No. PCT/CN2018/090437, filed on Jun. 8, 2018.

(30) Foreign Application Priority Data

Aug. 23, 2017    (CN) .......................... 201710730847.9

(51) Int. Cl.
*G06T 19/00*    (2011.01)
*G06F 3/01*    (2006.01)
*G06F 3/14*    (2006.01)

(52) U.S. Cl.
CPC .............. *G06T 19/00* (2013.01); *G06F 3/011* (2013.01); *G06F 3/1454* (2013.01)

(58) Field of Classification Search
CPC ........ G06F 3/011; G06F 3/1454; G06T 19/00; G09G 2354/00
See application file for complete search history.

(56) References Cited

U.S. PATENT DOCUMENTS

2015/0245168 A1* 8/2015 Martin .................. G06Q 50/01
                                                              715/751
2016/0332074 A1* 11/2016 Marr ....................... A63F 13/60
(Continued)

FOREIGN PATENT DOCUMENTS

CN        101635705 A       1/2010
CN        106982240 A       7/2017
(Continued)

OTHER PUBLICATIONS

Tencent Technology, ISRWO, PCT/CN2018/090437, Aug. 29, 2018, 6 pages.
(Continued)

*Primary Examiner* — Ming Wu
(74) *Attorney, Agent, or Firm* — Morgan, Lewis & Bockius LLP

(57) ABSTRACT

An information exchange method based on a virtual space scene is performed at a computing device, the method including: obtaining location information of a current terminal; obtaining, according to the location information of the current terminal, map data of a range in which the current terminal is located; drawing, according to the map data, a map in a constructed three-dimensional space, to obtain a drawing result; simulating, according to the drawing result, a real environment of a geographical location of the current terminal in the three-dimensional space, to obtain a virtual space for information exchange; and collecting an operation triggered by at least two terminals in the virtual space, and
(Continued)

controlling information exchange processing of the at least two terminals according to a generated operation instruction.

20 Claims, 9 Drawing Sheets

(56) References Cited

U.S. PATENT DOCUMENTS

2016/0379049 A1* 12/2016 Yu ..................... G06K 9/4633
 382/103
2017/0153787 A1* 6/2017 Chowdhary ........ G06F 3/04815

FOREIGN PATENT DOCUMENTS

| KR | 20120100433 A | 9/2012 |
| TW | 201335887 A | 9/2013 |

OTHER PUBLICATIONS

Tencent Technology, IPRP, PCT/CN2018/090437, Feb. 25, 2020, 5 pages.

* cited by examiner

INFORMATION INTERACTION METHOD BASED ON VIRTUAL SPACE SCENE, COMPUTER EQUIPMENT AND COMPUTER-READABLE STORAGE MEDIUM

CROSS-REFERENCE TO RELATED APPLICATIONS

This application is a continuation application of PCT/CN2018/090437, entitled "INFORMATION EXCHANGE METHOD BASED ON VIRTUAL SPACE SCENE, COMPUTER DEVICE, AND COMPUTER READABLE STORAGE MEDIUM" filed on Jun. 8, 2018, which claims priority to Chinese Patent Application No. 201710730847.9, filed with the Chinese Patent Office on Aug. 23, 2017 and entitled "INFORMATION EXCHANGE METHOD AND APPARATUS BASED ON VIRTUAL SPACE SCENE", both of which are incorporated by reference in their entirety.

FIELD OF THE TECHNOLOGY

This application relates to information exchange technologies, and especially, to an information exchange method based on a virtual space scene, a computer device, and a computer readable storage medium.

BACKGROUND OF THE DISCLOSURE

With continuous development of science and technology, the electronic technology has also been rapidly developed, there are also increasingly more types of electronic products, and people also enjoy various conveniences brought by the development of science and technology. Currently, people may enjoy, by using various types of electronic devices or terminals and applications of various functions installed on the terminals, comfortable life brought by the development of science and technology.

With development of virtual reality (VR) and augmented reality (AR) technologies, in addition to a real space in which a user is located, a virtual space may be further constructed for the user, and various services may be provided for the user in the virtual space. In terms of the VR technology, a virtual world of a three-dimensional space is generated through computer simulation, and a user is provided with simulation of a visual sense, an auditory sense, a touch sense, or the like, so that the user feels as if the user is personally on the scene. All scenes and people seen in VR are fake, and a person's consciousness is substituted into a virtual world. AR is a technology of calculating a location and an angle of a camera image in real time and adding a corresponding image, and can cover the real world with a virtual world on a screen and perform interaction.

There is a to-be-resolved technical problem about how to construct a virtual space for users, where the virtual space is simulation of a real environment, so that when information exchange, such as instant messaging, a real-time session, or a game, is implemented by using the virtual space, a processing result that the users are caused to mutually perform information exchange in the real environment is achieved. However, in the related art, there is no effective solution for the problem.

SUMMARY

Embodiments of this application provide an information exchange method based on a virtual space scene, a computer device, and a non-transitory computer storage medium.

An information exchange method based on a virtual space scene is provided, executed on a computing device having one or more processors and memory storing a plurality of programs to be executed by the one or more processors, and the method including:

obtaining location information of a current terminal;

obtaining, according to the location information of the current terminal, map data of a range in which the current terminal is located;

drawing, according to the map data, a map in a constructed three-dimensional space, to obtain a drawing result;

simulating, according to the drawing result, a real environment of a geographical location of the current terminal in the three-dimensional space, to obtain a virtual space for information exchange; and collecting an operation triggered by at least two terminals in the virtual space, and controlling information exchange processing of the at least two terminals according to a generated operation instruction.

A computing device is provided, including one or more processors, memory coupled to the one or more processors and a plurality of programs stored in the memory that, when executed by the one or more processors, cause the computing device to perform the aforementioned information exchange method.

A non-transitory computer readable storage medium storing computer readable instructions is provided in connection with a computing device, the computer readable instructions, when executed by one or more processors, causing the computing device to perform the aforementioned information exchange method.

Details of one or more embodiments of this application are provided in the accompany drawings and descriptions below. Other features, objectives, and advantages of this application will become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
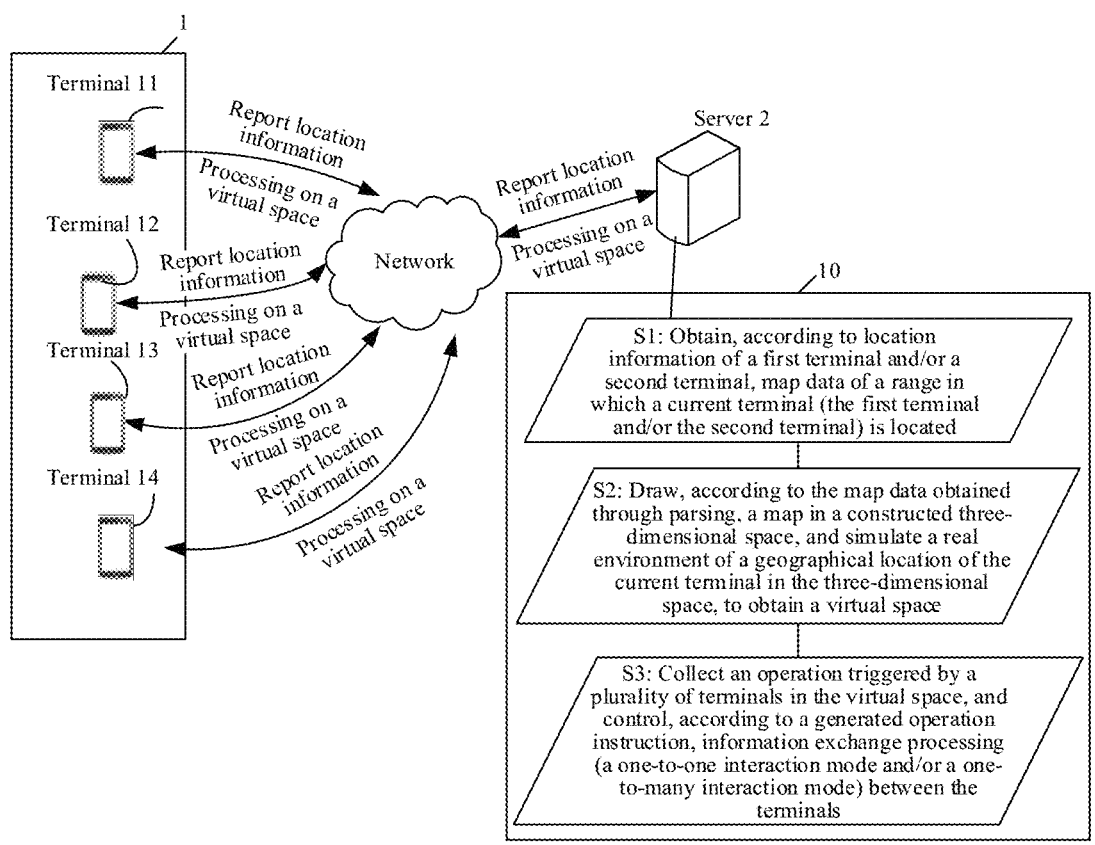
FIG. 1 is a schematic diagram of interaction between hardware entities according to an embodiment of this application.

The following clearly and completely describes the technical solutions in the embodiments of this application with reference to the accompanying drawings in the embodiments of this application.

A mobile terminal for implementing each embodiment of this application is described below with reference to the accompanying drawings. In subsequent descriptions, postfixes such as "module", "component" or "unit" that are used for representing elements are used merely for convenience of descriptions of the embodiments of this application, and have no particular meaning. Therefore, "module" and "component" may be mixed to use.

In the following detailed descriptions, many specific details are stated to thoroughly understand this application. However, for a person of ordinary skill in the art, apparently, this application may be implemented without these specific details. In other cases, disclosed well-known methods, processes, assemblies, circuits, and networks are not described in detail, to avoid unnecessary ambiguity in each aspect of the embodiments.

In addition, although terms such as "first" and "second" are used for a plurality of times in this specification to describe various elements (or various thresholds, various applications, various instructions, or various operations) and the like, these elements (or thresholds, applications, instructions, or operations) are not intended to be limited to these terms. These terms are merely used for distinguishing one element (or threshold, application, instruction, or operation) from another element (or threshold, application, instruction, or operation). For example, a first operation may be referred to as a second operation and a second operation may also be referred to as a first operation without departing from the scope of this application. The first operation and the second operation are both operations, but the two operations are not the same.

Steps in the embodiments of this application may not be performed in a described step order. The steps may be selectively disordered and rearranged according to a requirement, a step in an embodiment may be deleted, or a step may be added to an embodiment. The step descriptions in the embodiments of this application are merely an optional order combination and do not represent all step order combinations in the embodiments of this application. A step order in the embodiments is not to be considered as a limitation on this application.

The term "and/or" in the embodiments of this application refers to any and all possible combinations including one or more of related listed items. In this specification, "include/comprise" specifies existence of stated features, integers, steps, operations, elements, and/or components, buts does not exclude existence or addition of one or more other features, integers, steps, operations, elements, and/or components and/or a group thereof.

An intelligent terminal (for example, a mobile terminal) in the embodiments of this application may be implemented in various forms. For example, the mobile terminal described in the embodiments of this application may include mobile terminals such as a mobile phone, a smartphone, a notebook computer, a digital broadcast receiver, a personal digital assistant (PDA), a tablet computer (PAD), a portable media player (PMP), and a navigation apparatus and fixed terminals such as a digital TV and a desktop computer. It is assumed that a terminal is a mobile terminal below. However, it is to be understood by a person skilled in the art that unless an element particularly used for a mobile purpose, a construction according to an implementation of this application can also be applied to a terminal of a fixed type.

FIG. 1 is a schematic diagram of hardware entities performing information exchange according to an embodiment of this application. FIG. 1 includes a terminal device 1 and a server 2. The terminal device 1 includes terminal devices 11 to 14, and the terminal device includes a mobile phone, a desktop computer, a PC computer, an all-in-one machine, and the like. In a constructed virtual scene, the mobile phone is more practical. By means of this embodiment of this application, virtuality and reality combination of real geographical locations and a virtual world may be performed. The second world (the virtual world) is an application scenario of this application. In this scenario, friends may be pulled by using WeChat or the like, or strangers may be pulled by using a "discovery module". In the second world, according to a "discovery channel", specifically, according to a function of the discovery module, a virtual space obtained by performing drawing according to real geographical location data is used for information exchange between users in the second world. The terminal devices report respective real-time locations to a server, and the server stores the real geographical locations, draws a map in a constructed three-dimensional space according to the real geographical locations, and simulates a real environment of the geographical location in which a current terminal is located, to obtain a virtual space for information exchange, so that all terminal users may perform information exchange such as a session or a game in the virtual space. Data related to the virtual space may be pushed to the terminal device, and be displayed on the terminal device. Specifically, the following operations are included: 1) Obtain real geographical location data. That is, the first step is "real", and map data of a range in which a user is located may be obtained according to a current location (current latitude and longitude information obtained through global positioning system (GPS) positioning of a mobile phone) of the user. The map data includes basic data (for example, building information) and more refined auxiliary data (for example, a road/street, a river, or a bus station). 2) Draw a map of the virtual space according to the real geographical location data. That is: the second step is "virtual". Therefore, a "virtuality and reality combination effect" is achieved according to the first step and the second step. In the second step, when drawing a map, drawing and later modifications are performed on the to-be-drawn map according to a reusable preset model (for example, drawing and adjustment are performed on a height/width of a building model, a length/width of a road model, a length/width of a bus station, and the like).

In the information exchange, real map data may be dynamically loaded according to movement of a location of a user (represented by a first terminal user), and map drawing in the virtual space is performed; and map drawing is performed for another user (represented by a second terminal user) according to a location of the another user.

In the information exchange, a user (represented by the first terminal user) and another user (represented by the second terminal user) may perform information exchange, for example, triggering interaction between the two users by collision, or entering a group session.

In addition to the foregoing map drawing for the current location of a province in which the user is located, a system may further randomly configure locations of other provinces for the user, a load balance needs to be considered and a room is allocated to the user.

An image-editing processing logic 10 performed on a server side is shown in FIG. 1, and the processing logic 10 includes the following operations: S1: Obtain, according to location information (current real-time location information and/or one piece of location information given when randomly switching the terminal to another province in consideration of the load balance) of a first terminal and/or a second terminal, map data of a range in which a current terminal (the first terminal and/or the second terminal) is located. S2: Parse the obtained map data (obtaining methods of the map data have a plurality of specific implementations, and are respectively subsequently described by means of the first map data, the second map data, the third map data, and the fourth map data, "the first to the fourth" herein do not represent a time order of obtaining the map data and are merely used for distinguishing the map data obtained by different obtaining methods, and the map data may be the same, or may be different from each other), draw, according to the map data obtained through parsing, a map in a constructed three-dimensional space, and simulate a real environment of a geographical location of the current terminal in the three-dimensional space, to obtain a virtual space. S3: Collect an operation triggered by a plurality of terminals in the virtual space, and control, according to a generated operation instruction, information exchange processing (a one-to-one interaction mode and/or a one-to-many interaction mode) between the terminals.

The example in FIG. 1 is merely an example of a system architecture for implementing the embodiments of this application, and the embodiments of this application are not limited to the system architecture shown in FIG. 1. Various embodiments of the method of this application are proposed based on the system architecture described in FIG. 1.

Figure 2:
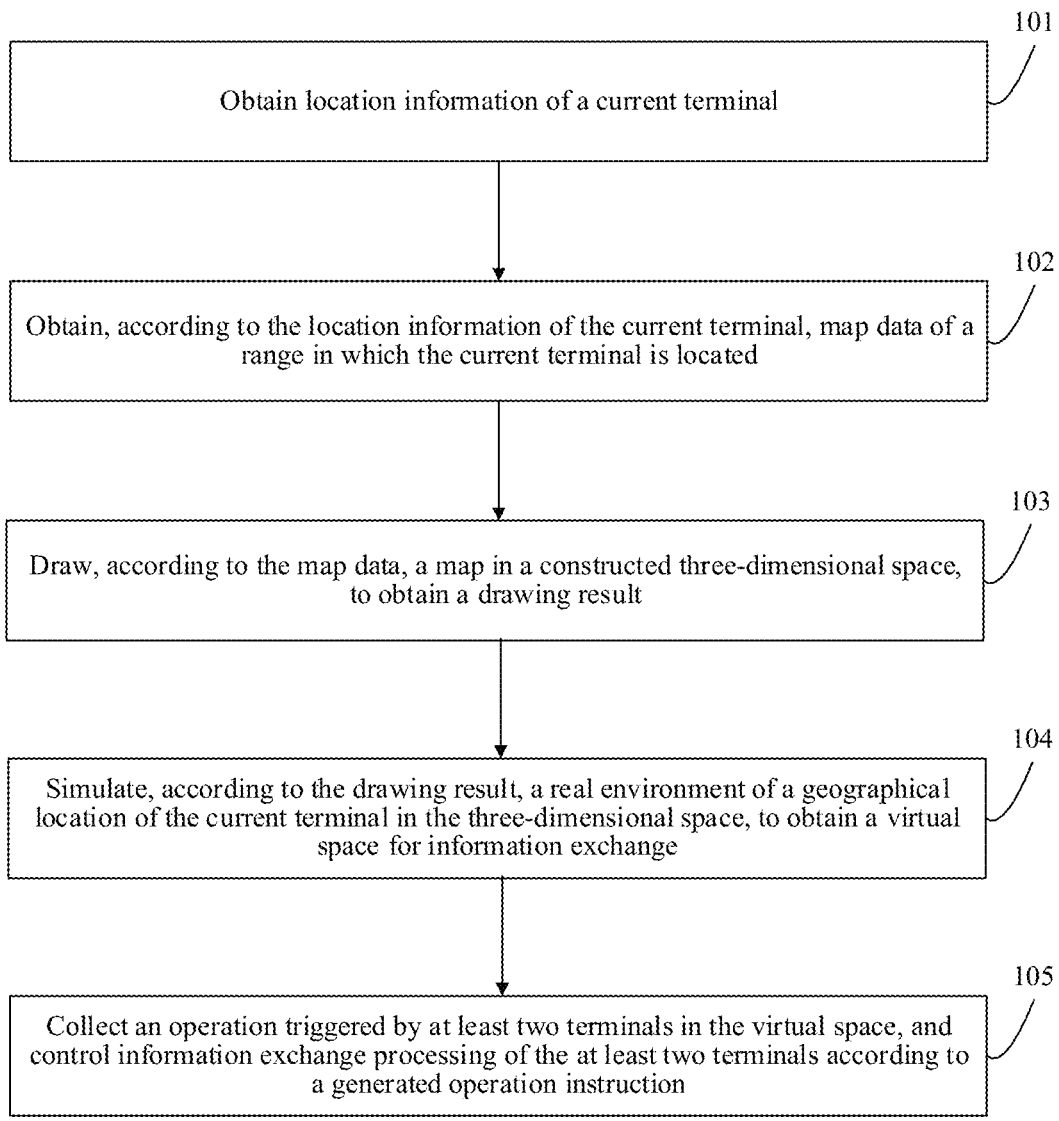
FIG. 2 is a flowchart of an information exchange method based on a virtual space scene according to an embodiment of this application.

An information exchange method based on a virtual space scene according to an embodiment of this application is shown in FIG. 2, and the method includes: obtaining location information of the current terminal (101); obtaining, according to the location information of the current terminal, map data of a range in which the current terminal is located (102); drawing, according to the map data, a map in a constructed three-dimensional space, to obtain a drawing result (103); simulating, according to the drawing result, a real environment of a geographical location of the current terminal in the three-dimensional space, to obtain a virtual space for information exchange (104); and collecting an operation triggered by at least two terminals in the virtual space, and controlling information exchange processing of the at least two terminals according to a generated operation instruction (105). In this embodiment of this application, a virtual space is constructed for users, where the virtual space is simulation of a real environment, so that when information exchange, such as instant messaging, a real-time session, or a game, is implemented by using the virtual space, a processing result that the users are caused to mutually perform information exchange in the real environment is achieved.

Figure 3:
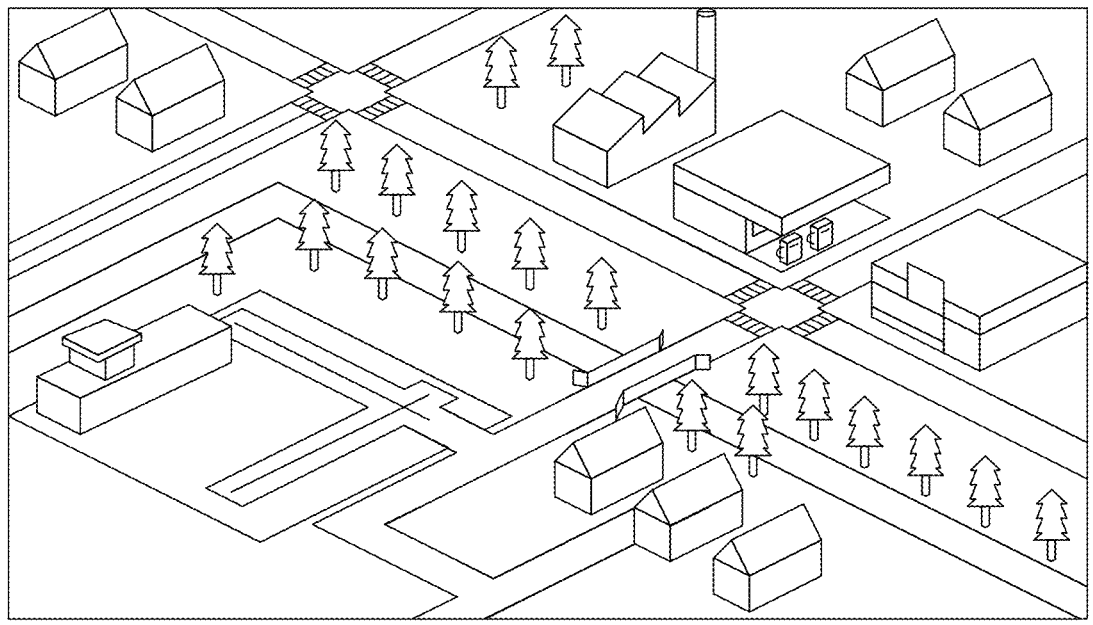
FIG. 3 is an example diagram of a real world according to an embodiment of this application.
Figure 4:
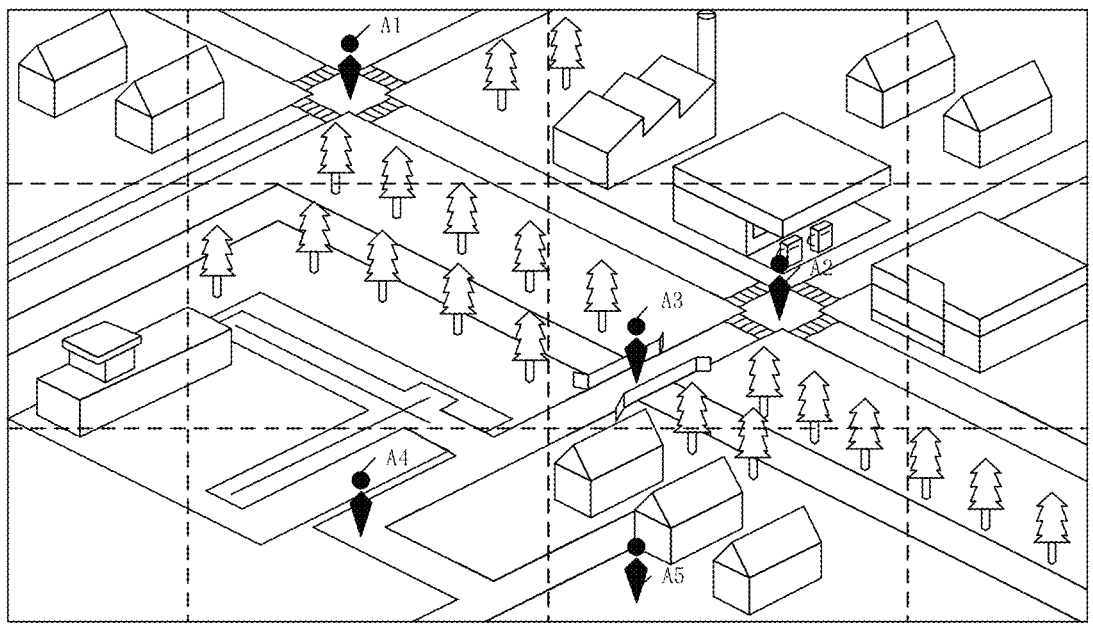
FIG. 4 is an example diagram of a virtual space obtained by simulating the real world according to an embodiment of this application.
Figure 5:
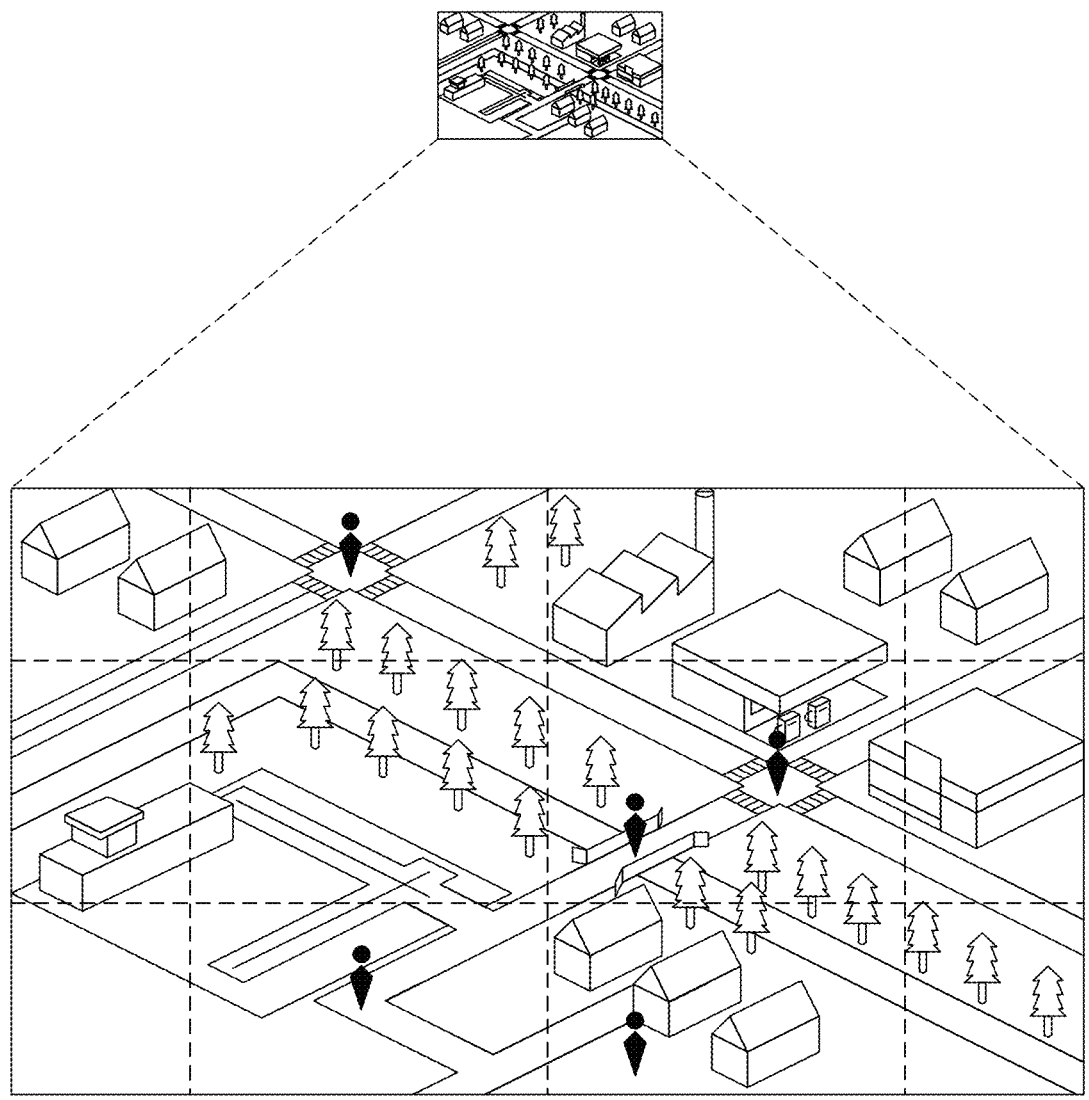
FIG. 5 is an example diagram of obtaining the virtual space through perspective, mapping, or projection in the real world according to an embodiment of this application.
Figure 6:
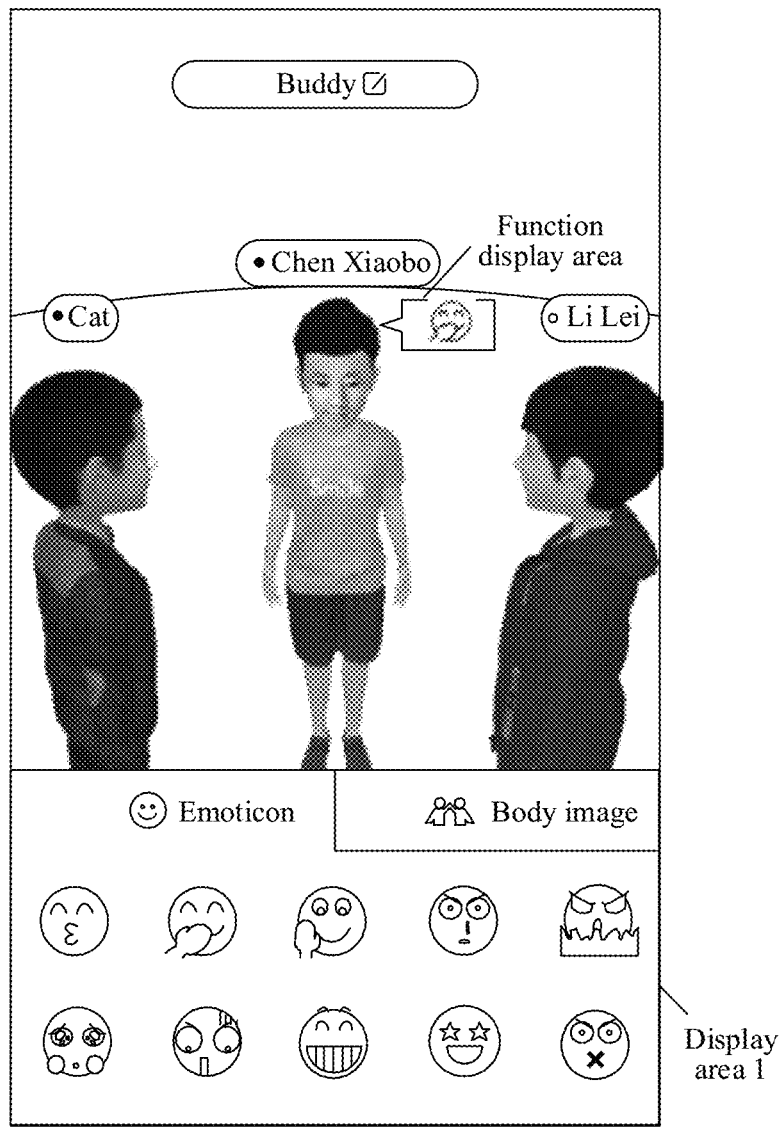
FIG. 6 and FIG. 7 are schematic diagrams of performing a group chat in the virtual space according to an embodiment of this application.
Figure 7:
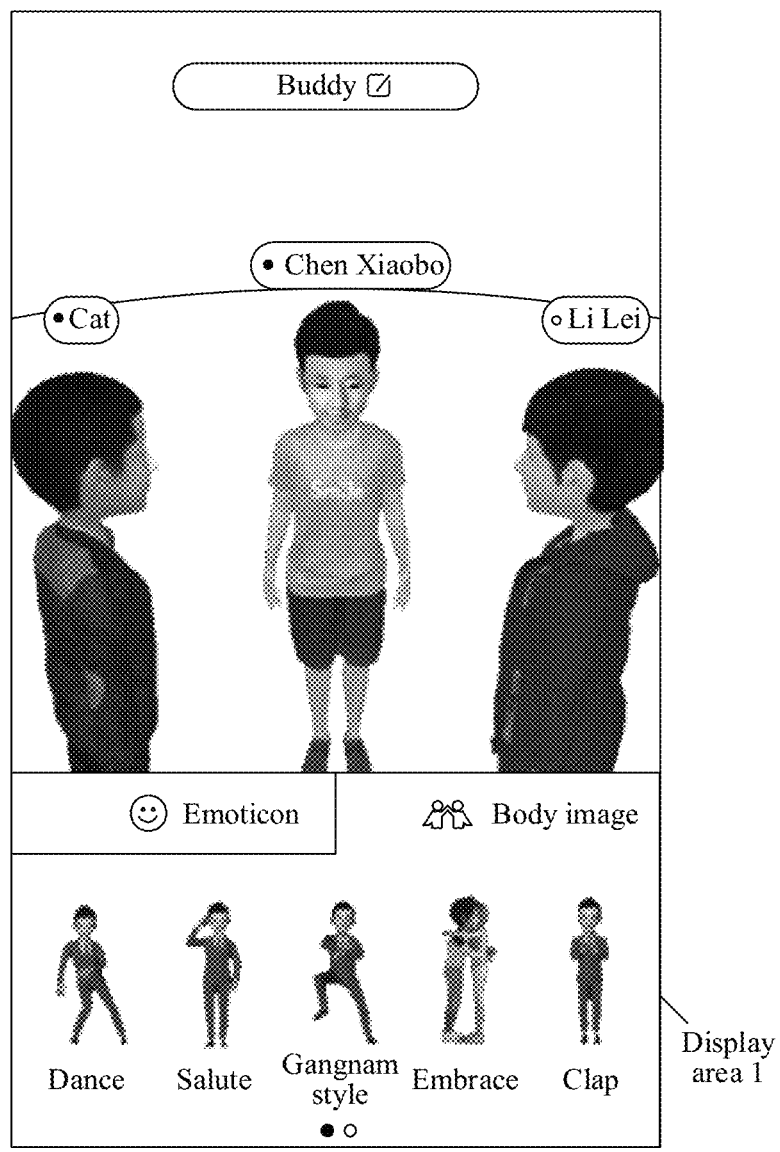

Specifically, in an actual application of this embodiment, by combining the real geographical location data with the virtual three-dimensional space, and adding, into the three-dimensional space, the map drawn according to the real geographical location data, the real environment of the geographical location of the current terminal may be simulated in the virtual three-dimensional space. In addition to simulating the geographical location of the current terminal (for example, it is represented by using the first terminal), geographical location of a plurality of other terminals (for example, it is represented by using the second terminal) may be further simulated, to obtain a virtual space for information exchange of at least two terminals. The virtual space is simulation of the real environment, that is, in this embodiment of this application, data synchronization is performed between the virtual space and geographical information of the real world, so that a plurality of terminal users have an experience of performing information exchange in the real environment when interacting with each other. The virtual space may be a virtual community formed by a plurality of terminal users, and the virtual community is a virtual community based on panoramic real images and geographical information, so that information exchange such as instant messaging, a real-time session, or a game may be implemented when a user interacts with the environment in the virtual community and the current user interacts with another user. In the virtual community, a virtual ground may be included. Various three-dimensional entities, such as a virtual storied building, a virtual road/street, a virtual bridge, a virtual bus station, and the like may be added on the virtual ground, and anything that exists in the real world may be presented in the virtual community. The virtual community may be referred to as a second world since it is different from the real world (a first world). FIG. 3 is a schematic diagram of buildings, rivers, roads, and trees that really exist in the first world. FIG. 4 is a schematic diagram of a virtual space obtained by simulating, in the second world, buildings, rivers, roads, and trees really existing in the first world. In the virtual space, transverse and longitudinal dotted lines are used for representing longitude and latitude (it is merely schematic). Terminal users A1 to A5 are included, and locations of the terminal users A1 to A5 in the virtual space, and relative distances of the terminal users to a nearby building 3D object, a road/street, a river, and a tree are all the same as locations and relative distances of the terminal users in the first world. FIG. 5 is a schematic diagram of a relationship between the first world and the second world. The second world is obtained by simulating the real map data of the first world, and through a perspective, mapping, or projection relationship with the first world, the second world is obtained according to the real map data, preset model files, and model instances. In the second world, the plurality of terminal users may have a one-to-one session, or a group chat among many persons in the information exchange status shown in FIG. 6 to FIG. 7. In the group chat, a voice chat and a text chat are available, and emoticons or body pictures may alternatively be transmitted and displayed in a display area 1 of each terminal.

In an embodiment, the second world is a virtual space (or may be referred to as a virtual community) constructed by using the VR technology, and may be used for social intercourse and sharing among a plurality of terminal users. A virtual 3D image of a user may be generated according to a photo of the user, and the second world further includes rich social playing methods, which can chat with one person or a group of persons in real time.

In an embodiment, the terminal users performing the real-time chat may be a first information group formed by friends pulled through a social application such as WeChat or QQ, and a group used for a real-time chat is constructed according to the first information group.

In an embodiment, the terminal users performing the real-time chat may be a second information group formed by pulled strangers, and a group used for a real-time chat is constructed according to the second information group. Pulling strangers may cause the user to make new friends more effectively. For example, the map data of the range in which the current terminal is located is obtained based on the location information of the current terminal (for example, the first terminal), and another terminal (for example, the second terminal) which is relatively close to the current terminal is found through analysis according to the map data. Therefore, another terminal (for example, the second terminal) meeting the geographical location requirement in the range is added into the second information group. Further, whether the current terminal (for example, the first terminal) and another terminal (for example, the second terminal) have the same feature needs to be further determined. For the same feature, the two terminal users generate respective virtual 3D images in the second world according to photos of the terminal users.

In an embodiment, in the second world, a stranger is pulled by using the discovery channel. In the discovery channel, division may be performed according to different provinces of a country, and a discovery room is randomly created by using the real-time geographical location, to obtain map information (including the building information, the road, the river, the tree, and the bus station) of the location of the current terminal. Corresponding model files, including models such as buildings, roads, rivers, and woods are preset according to a map information type, and drawing is performed on the models according to sizes and locations identified on the map data. Then, new map data generated according to the movement change of the current location may be further loaded in real time according to the movement of the character corresponding to the current terminal, to ensure that the discovery map can be infinitely extended. The user may further make more real friends in the infinitely extended virtual space scene according to the location information, and enters a session status in the virtual scene. In addition to supporting a one-to-one session, a many-to-many session (a plurality of persons) is further supported in simultaneously entering one group (for example, the first information group, the second information group, and a third information group formed by an intersection, a union, and a collection of the first information group and the second information group) to enter a group chat status.

In this embodiment of this application, the latitude and longitude information of the current terminal is obtained through GPS, the location information of the current terminal is identified by using the latitude and longitude information, and data within a preset range radiated outward by using the latitude and longitude information as a center is determined as the map data of the range in which the current terminal is located. Therefore, the map data of the range in which the current terminal is located is obtained according to the location information of the current terminal.

In this embodiment of this application, there are a plurality of manners of obtaining the map data, and a solution of obtaining the drawing result by drawing a map in the constructed three-dimensional space according to the map data may have a combination of at least one of the following, including:

1. Different regions (for example, provinces, cities, municipalities, autonomous prefectures, districts, or counties) are obtained through division for a to-be-drawn map according to different provinces of a country in the constructed three-dimensional space. This embodiment of this application is simulation of the real world, so that regions into which the to-be-drawn map is divided in the constructed three-dimensional space are the same as regions obtained through division of the real map information. A real-time location of the current terminal in a current region (for example, Beijing) is obtained, and first map data (it refers to the current map data, and in an embodiment in which the map data is updated subsequently, for distinguishing the map data from new map data generated by the subsequent location movement, the new map data is represented by second map data) is pulled according to the real-time location identified by the latitude and longitude information. The first map data is parsed, to obtain basic-class data (for example, building information) and auxiliary-class data (for example, a road/street, a river, a bus station, and the like), the basic-class data is used for representing the first location information including the building information, and the auxiliary-class data is used for representing the second location information including the road, the street, the river, and the bus station. A first model file (for example, a model file corresponding to a Prefab model instance) is obtained according to the first location information. For example, the length, the width, and the height of the building information may generate a 3D storied building, and the length, the width, and the height may be adjusted later). A first model instance (for example, a Prefab model instance, where Prefab model instances correspond to different map data types, for example, Prefab model instances of the basic-class data and the auxiliary-class data are different) is established according to the first model file. A second model file is obtained according to the second location information, and a second model instance is established according to the second model file. Map drawing of the first model instance and the second model instance is performed in the three-dimensional space respectively according to the latitude and longitude information corresponding to the first location information, the latitude and longitude information corresponding to the second location information, basic attributes (for example, the length, the width, and the height), and auxiliary identification information (for example, identifiers near the building).

2. Different regions (for example, provinces, cities, municipalities, autonomous prefectures, districts, or counties) are obtained through division for a to-be-drawn map according to different provinces of a country in the constructed three-dimensional space, and a real-time location change of the current terminal in the current region is monitored. In one scene, the map is updated and extended according to data of a change quantity from the first real-time location to the second real-time location, and the advantage is that: compared with the first solution, the update of partial data has higher efficiency but may have an error in calculation accuracy. Specifically, second map data generated by the current terminal based on the current real-time location change is loaded in real time according to a location change parameter generated in response to moving from a first real-time location to a second real-time location, and the second map data is pulled in response to finding, through monitoring, that the real-time location of the current terminal moves from the first real-time location to the second real-time location. The second map data is parsed, to obtain basic-class data and auxiliary-class data, the basic-class data is used for representing the third location information including the building information, and the auxiliary-class data is used for representing the fourth location information including the road, the street, the river, and the bus station. A third model file is obtained according to the third location information, and a third model instance is established according to the third model file. A fourth model file is obtained according to the fourth location information, and a fourth model instance is established according to the fourth model file. Map drawing of the third model instance and the fourth model instance is performed in the three-dimensional space respectively according to the latitude and longitude information corresponding to the third location information, the latitude and longitude information corresponding to the fourth location information, basic attributes, and auxiliary identification information.

3. Different regions (for example, provinces, cities, municipalities, autonomous prefectures, districts, or counties) are obtained through division for a to-be-drawn map according to different provinces of a country in the constructed three-dimensional space, and a real-time location change of the current terminal in the current region is monitored. In another scene, the map is reconstructed according to the second real-time location, and refreshing is performed according to the reconstructed map data, to refresh all of the map data. The advantage is that: the calculation is more precise by refreshing all the data. Specifically, third map data is generated according to a second real-time location, and the third map data is pulled in response to finding, through monitoring, that the real-time location of the current terminal moves from a first real-time location to the second real-time location. The third map data is latitude and longitude information that is obtained by using the GPS and that corresponds to the second real-time location of the current terminal, and data within a preset range radiated outward by using the latitude and longitude information as a center may be determined as the map data of the range in which the current terminal is located, where the map data is the third map data.

The third map data is parsed, to obtain basic-class data and auxiliary-class data, the basic-class data is used for representing the fifth location information including the building information, and the auxiliary-class data is used for representing the sixth location information including the road, the street, the river, and the bus station. A fifth model file is obtained according to the fifth location information, and a fifth model instance is established according to the fifth model file. A sixth model file is obtained according to the sixth location information, and a sixth model instance is established according to the sixth model file. Map drawing of the fifth model instance and the sixth model instance is performed in the three-dimensional space respectively according to the latitude and longitude information corresponding to the fifth location information, the latitude and longitude information corresponding to the sixth location information, basic attributes, and auxiliary identification information.

4. Different regions (for example, provinces, cities, municipalities, autonomous prefectures, districts, or counties) are obtained through division for a to-be-drawn map according to different provinces of a country in the constructed three-dimensional space, and the real-time location of the current terminal in the current region is switched to a designated region in another province. A target location is randomly allocated, according to an upper limit requirement of terminal users of the same province, for the current terminal in the designated region. For example, a room is randomly allocated based on an upper limit of 50 users in the same province, and the room is a region meeting one latitude and longitude range. A target location of the current terminal is obtained, and fourth map data is pulled according to the target location identified by the latitude and longitude information. For example, the real-time location of the user is in Beijing, and the user may be switched to another province such as Shanghai. In this case, the longitude and latitude coordinates are not the real-time location used for identifying the user, but are a target location randomly allocated by the apparatus in this embodiment of this application to the user, and data within a preset range radiated outward by using the latitude and longitude information corresponding to the target location as a center may be determined as the map data of the range in which the current terminal is located, where the map data is the fourth map data.

The fourth map data is parsed, to obtain basic-class data and auxiliary-class data, the basic-class data is used for representing the seventh location information including the building information, and the auxiliary-class data is used for representing the eighth location information including the road, the street, the river, and the bus station. A seventh model file is obtained according to the seventh location information, and a seventh model instance is established according to the seventh model file. An eighth model file is obtained according to the eighth location information, and an eighth model instance is established according to the eighth model file. Map drawing of the seventh model instance and the eighth model instance is performed in the three-dimensional space respectively according to the latitude and longitude information corresponding to the seventh location information, the latitude and longitude information corresponding to the eighth location information, basic attributes, and auxiliary identification information.

In the foregoing plurality of embodiments, a plurality of model files corresponding to different location information, and a plurality of model instances respectively corresponding to the plurality of model files are involved. Corresponding models, including models such as buildings, roads, rivers, parks, and woods are respectively preset for different types of map data (the basic-class data and the auxiliary-class data). Model instances are established according to the preset model files (for example, Prefab, where Prefab is a resource reference file of Unity, and the same object may be created by using a prefab). In a process of drawing a map, corresponding model instances are selected according to different types of map data (the basic-class data and the auxiliary-class data). Basic attributes such as the length, the width, and the height of the plurality of model instances may be different. However, for one same model instance, for example, a building 3D object representing a storied building may be reused for a plurality of times. For another example, a building 3D object representing a commercial building may also be reused for a plurality of times, a building 3D object representing a road/street may be reused for a plurality of times, and so on. That is, the same object may be created by using one prefab, and repeated instantiation is supported to reduce overheads. When a model corresponding to a model file is instantiated, a map may be drawn by using a model instance according to longitude and latitude coordinates, basic attributes, and auxiliary identification information on the map data.

In this embodiment of this application, a stranger may be pulled by using the discovery channel in the second world. In the discovery channel, division may be performed according to different provinces of a country, and a discovery room is randomly created by using the real-time geographical location, to obtain map information (including the building information, the road, the river, the tree, and the bus station) of the location of the current terminal. Corresponding model files, including models such as buildings, roads, rivers, and woods are preset according to a map information type, and drawing is performed on the models according to sizes and locations identified on the map data. Then, new map data generated according to the movement change of the current location may be further loaded in real time according to the movement of the character corresponding to the current terminal, to ensure that the discovery map can be infinitely extended. The user may further make more real friends in the infinitely extended virtual space scene according to the location information, and enters a session status in the virtual scene.

In this embodiment of this application, in a scene of drawing a map and performing simulation to obtain a virtual space, a three-dimensional environment of the virtual space may be created by using a 3D graphics program interface, and an outer display screen of the scene may be drawn in the three-dimensional environment of the virtual space. Specifically, corresponding model files, including models such as buildings, roads, rivers, and woods are preset according to a map information type, and drawing is performed on the models according to sizes and locations identified on the map data. It may be learned that the model is a storied building, a store, or a road. To better simulate and display map data in the three-dimensional space, storied buildings need to be different from each other. Therefore, the collected panoramic real image data may be transmitted from a server to a 3D display platform in the terminal and is mapped to the outer display screen of the scene in a texture mapping manner, to obtain a virtual space based on the outer display screen of the scene.

Figure 8:
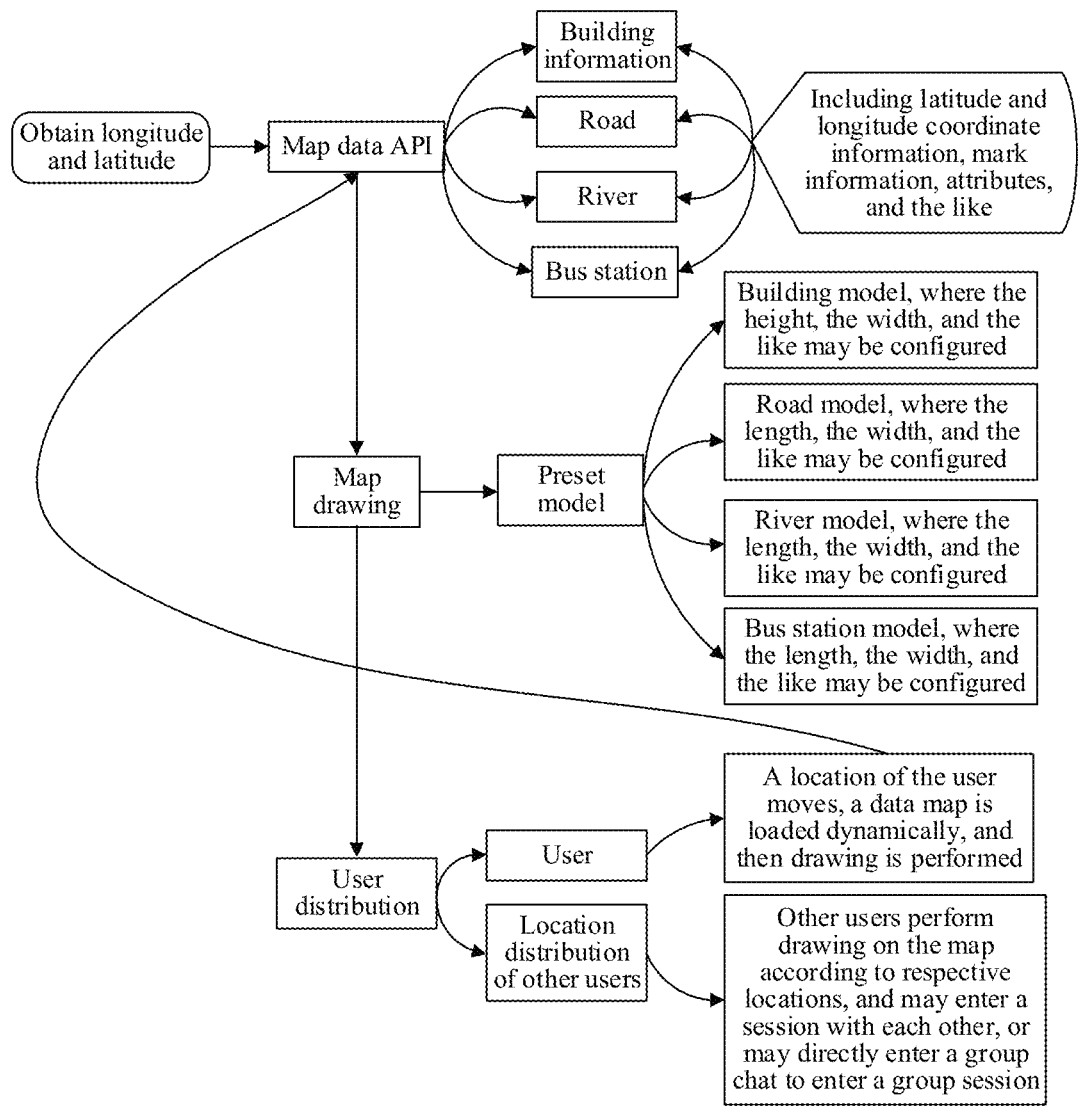
FIG. 8 is a schematic diagram of information exchange in a scenario to which an embodiment of this application is applied.

In this embodiment of this application, in a scene of generating a virtual space by combining the real geographical locations and a virtual preset module, as shown in FIG. 8, the real-time geographical location may be used in the discovery module of the second world, to obtain map information (including building information, roads, rivers, trees, and bus stations) of a current location module, and corresponding models (including models such as buildings, roads, rivers, parks, and woods) are preset according to an obtained information type. Before this, Prefab is established by using a preset model file, a model prefab is selected and instantiated according to the type of the map data, and a map is drawn by using the model according to longitude and latitude coordinates, basic attributes, and auxiliary identification information on the map data. Specifically, the following operations are included: 1) obtaining, by using a location management and synchronization component, latitude and longitude information of a current user in real time, and synchronizing the latitude and longitude information to a server regularly, to obtain location coordinates of other users and perform drawing in a map; 2) obtaining, by using a map application programming interface (API) obtaining component, map data of a current region under a zooming coefficient according to the latitude and longitude information of the location of the current user, and performing map drawing according to map data information returned by a map API interface; 3) designing, according to a preset Prefab model instance and elements drawn on the map, a corresponding model file in advance, and reusing, based on the instantiation of the same resource of the Prefab, a model to draw the map, which can greatly reduce performance consumption; and 4) performing character collision detection, group member area collision, friend profile management, and chat scene management, to make it convenient for users to have different options when establishing interaction with each other. In a process of virtuality and reality combination, all users may be allocated to different provinces according to geographical locations, a room is randomly allocated based on an upper limit of 50 users in the same province, and new map data generated by the change of the current location is loaded in real time according to the movement of a model of the current user. Therefore, the discovery map may be infinitely extended, and the user may make more real friends in the scene according to locations, and enter a session status in the virtual scene. Besides, a plurality of persons are supported in simultaneously entering a group chat status. A virtual space may be generated by means of VR and AR technologies, and the real world and the virtual space are combined to be acquainted with a new user more effectively based on a location. Division is performed according to different provinces of a country, a discovery room is randomly created by using the real-time geographical location, and new map data generated by the change of the current location is loaded in real time according to the movement of a character, so that the discovery map may be infinitely extended, and a user may make more real friends in the scene according to locations. In this way, costs of making a new friend are reduced, and a social relationship may be easily established. A user may check personal information and image of the user by tapping the user, or enters a session and participates in a group chat with other persons by discovery, to search for a friend in which the user is interested.

In terms of VR and AR, in addition to a real space in which the user is located, a virtual space may be further constructed for the user. In the VR technology, a virtual world of a three-dimensional space is generated through computer simulation, and a user is provided with simulation of a visual sense, an auditory sense, a touch sense, or the like, so that the user feels as if the user is personally on the scene, and observes things in the three-dimensional space in time and with no limitation. When the user performs location movement, the computer can immediately perform complex operations to transmit back an accurate 3D world video to generate a sense of presence. All scenes and people seen are fake, and a person's consciousness is substituted into a virtual world, which includes a combination of a plurality of technologies, for example, a real-time three-dimensional computer graphics technology, a wide angle (wide field of view) stereoscopic display technology, a technology of tracking an observer's head, eye, and hand, a tactile/force feedback technology, a stereo technology, a network transmission technology, a voice input/output technology, and the like. AR is also referred to as an augmented reality technology, and is a new technology of "seamlessly" integrating information about a real world and information about a virtual world, where entity information (for example, visual information, voice, taste, sense of touch, and the like) that is originally hardly experienced within a certain time space range of the real world is simulated and then superimposed through science technologies such as a computer, and the virtual information is applied to the real world, and sensed by a human sense, to reach a sense experience exceeding the reality. The real environment and the virtual object are superimposed in real time to the same picture or space to exist at the same time. The information about the real world is presented, the virtual information is displayed at the same time, and the two types of information complement each other and are superimposed. In visual augmented reality, the user synthesizes a real world and computer graphics by using a helmet display, so that it can be seen that the real world is surrounded by the graphics.

In this embodiment of this application, the operation triggered by the at least two terminals in the virtual space may be collected, and the information exchange processing is triggered in a case that the operation meets a collision detection policy and/or a group member area collision policy. A first operation instruction is generated according to the collision detection policy, where the first operation instruction is used for controlling the at least two terminals to perform a one-to-one interaction mode, and a one-to-one user session state between terminals is entered in response to the first operation instruction. A second operation instruction is generated according to the group member area collision policy, where the second operation instruction is used for controlling the at least two terminals to perform a one-to-many interaction mode, and a one-to-many user group chat state between terminals is entered in response to the second operation instruction. In a process of making more real friends according to the location information, a session status is entered by using the virtual scene. In addition to supporting a one-to-one session, a many-to-many session (a plurality of persons) is further supported in simultaneously entering one group (for example, the first information group, the second information group, and a third information group formed by an intersection, a union, and a collection of the first information group and the second information group) to enter a group chat status. Specifically, specific information exchange may be triggered through character collision detection, group member area collision, friend profile management, and chat scene management, to make it convenient for users to have different options when establishing interaction with each other.

In this embodiment of this application, the virtual space may be transmitted to at least two terminals for display. The virtual space is provided with a default viewing angle. In an example, when the terminal is VR glasses, the default viewing angle may be a viewing angle from which a 3D entity (for example, a virtual object) may be browsed in a normal mode after entering the VR mode. The virtual object may be static, or may be moving. In a case that the virtual object is in a static state, browsing may be performed by using the default viewing angle without a problem. However, in a case that the virtual object is in a moving state, browsing performed by using the default viewing angle can hardly meet a browsing requirement. In this case, the terminal may adjust the viewing angle according to a current browsing requirement. That is, any terminal may transmit a viewing angle control instruction to one server, a control processor in one server, or a hardware entity that is in a server cluster and that is used for processing the control instruction, and the recipient (for example, one server, a control processor in one server, or a hardware entity that is in a server cluster and that is used for processing the control instruction) receives the viewing angle control instruction, generates a corresponding virtual space according to the viewing angle control instruction, and transmits the virtual space to the corresponding terminal.

In this embodiment of this application, in an example, in a case that the terminal is VR glasses, the recipient (for example, one server, a control processor in one server, or a hardware entity that is in a server cluster and that is used for processing the control instruction) may further receive a display control instruction transmitted by any terminal. Operations performed according to the scene in which the terminal user is located, for example, a browsing operation in a game and ordinary browsing are different, and a virtual object may hide and jump in the game. To accurately capture a specific operation and perform response processing such as information exchange between the current terminal and another terminal, the terminal may transmit a display control instruction to the foregoing recipient, and the recipient generates a corresponding virtual space according to the display control instruction and then transmits the virtual space to another terminal. The display control instruction controls real-time display of the terminal on the virtual space, and the real-time display includes one of or a combination of more than one of avatar display, action display, a text identifier, and invisible display that are controllable in real time.

In this embodiment of this application, one server, a control processor in one server, or a hardware entity that is in a server cluster and that is used for processing the control instruction may further collect interaction operations between any terminal and the 3D entity (for example, the virtual object) in the virtual space. For example, the virtual object is a cartoon character, and in a game scene of parkour of a cartoon character, the information exchange processing between the terminal and the virtual object may be controlled according to generated operation instructions (for example, upward movement, downward movement, left movement, right movement, and jump), to make the cartoon character perform corresponding operations such as upward movement, downward movement, left movement, right movement, and jump in a preset game scene according to the control of the operation instructions (for example, upward movement, downward movement, left movement, right movement, and jump).

In this embodiment of this application, recovery of the process interrupted in real time is re-initiated in a case that any process is interrupted in real time, where the process includes a drawing process of the map, generation of the virtual space, and the information exchange processing of the at least two terminals. A notification is sent, in a case that a condition of the real-time interruption meets a notification policy to the terminal participating in the process.

In this embodiment of this application, attribute information of the current terminal and attribute information of other terminals in the virtual space may be obtained. A virtual space matching the different attribute information is generated according to the obtained different attribute information. For example, for terminals with screens of different sizes and terminals with different models, different definitions may respectively be set for different terminals. In a case that one terminal is a mobile phone, and one terminal is an in-vehicle terminal, or different terminals are covered under different signal network modes, virtual spaces transmitted to the terminals by one server, a control processor in one server, or a hardware entity that is in a server cluster and that is used for processing the control instruction may be different from each other in data volume or adaptable screen.

FIG. 2 is a schematic flowchart of a method according to an embodiment of this application. It is to be understood that although the steps in the flowchart in FIG. 2 are sequentially shown according to indication of an arrow, the steps are not necessarily sequentially performed according to a sequence indicated by the arrow. Unless explicitly specified in this application, execution of the steps is not strictly limited, and the steps may be performed in other sequences. Besides, at least some steps in FIG. 2 may include a plurality of sub-steps or a plurality of stages, the sub-steps or stages are not necessarily performed at the same moment and may be performed at different moments, the sub-steps or stages are not necessarily sequentially performed, and the sub-steps or stages and at least some of other steps or sub-steps or stages of other steps may be performed in turn or alternately.

Figure 9:
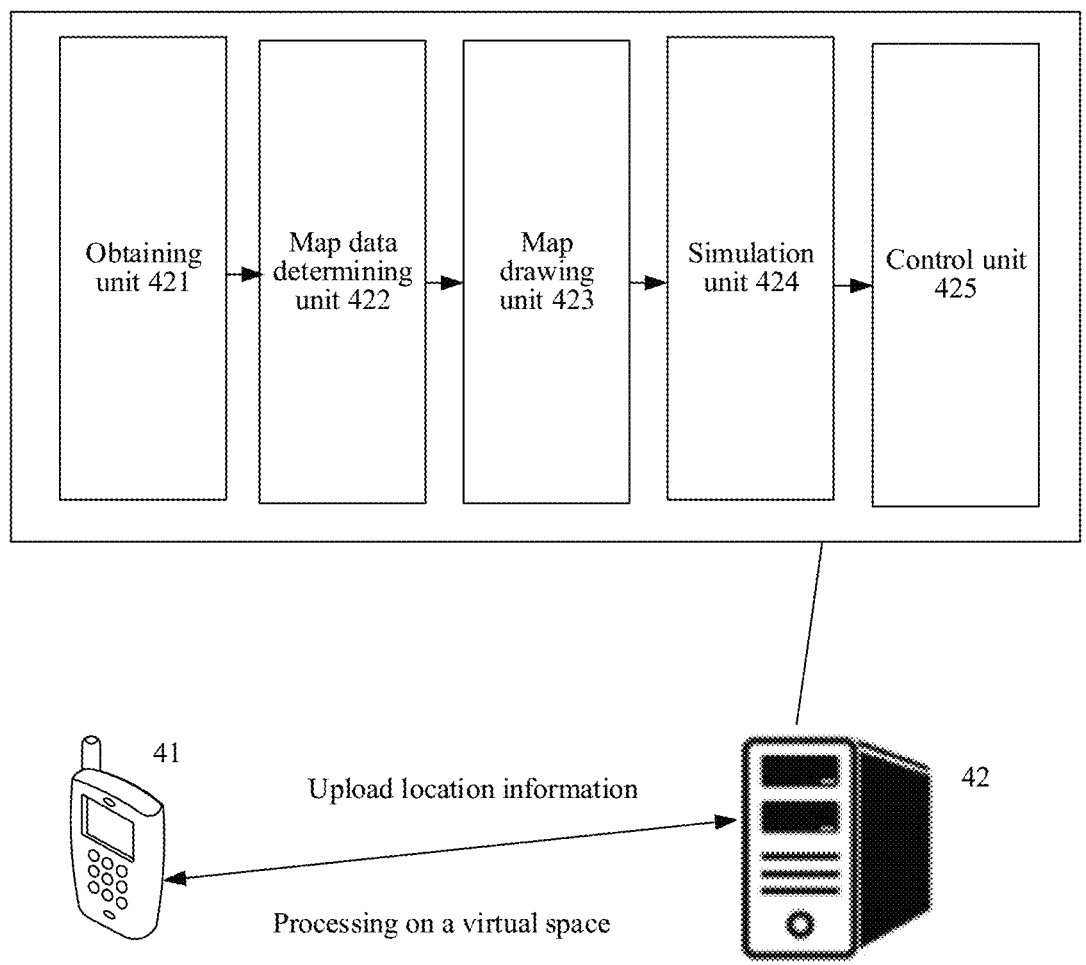
FIG. 9 is a schematic diagram of composition of an apparatus according to an embodiment of this application.

An information exchange apparatus based on a virtual space scene according to an embodiment of this application is shown in FIG. 9. The apparatus includes: a terminal 41 and a server 42. As shown by the processing logic 10 in FIG. 1, all or a part of a processing logic may be performed in the server 42. The server includes: an obtaining unit 421, configured to obtain location information of a current terminal; a map data determining unit 422, configured to obtain, according to the location information of the current terminal, map data of a range in which the current terminal is located; a map drawing unit 423, configured to draw, according to the map data, a map in a constructed three-dimensional space, to obtain a drawing result; a simulation unit 424, configured to simulate, according to the drawing result, a real environment of a geographical location of the current terminal in the three-dimensional space, to obtain a virtual space for information exchange; and a control unit 425, configured to collect an operation triggered by at least two terminals in the virtual space, and control information exchange processing of the at least two terminals according to a generated operation instruction.

In this embodiment of this application, the map data determining unit is further configured to: obtain, according to GPS, latitude and longitude information of the current terminal, and identify the location information of the current terminal by using the latitude and longitude information; and determine data within a preset range radiated outward by using the latitude and longitude information as a center as the map data of the range in which the current terminal is located.

In this embodiment of this application, the map drawing unit is further configured to: obtain, through division, different regions for a to-be-drawn map according to different provinces of a country in the constructed three-dimensional space; obtain a real-time location of the current terminal in a current region, and pull first map data according to the real-time location identified by the latitude and longitude information; parse the first map data, to obtain basic-class data and auxiliary-class data, where the basic-class data is used for representing the first location information including the building information, and the auxiliary-class data is used for representing the second location information including the road, the street, the river, and the bus station; obtain a first model file according to the first location information, and establish a first model instance according to the first model file; obtain a second model file according to the second location information, and establish a second model instance according to the second model file; and perform map drawing of the first model instance and the second model instance in the three-dimensional space respectively according to the latitude and longitude information corresponding to the first location information, the latitude and longitude information corresponding to the second location information, basic attributes, and auxiliary identification information.

In this embodiment of this application, the apparatus further includes: a monitoring unit, configured to monitor a real-time location change of the current terminal in the current region; and notify the map drawing unit in response to finding, through monitoring, that the real-time location of the current terminal moves from a first real-time location to a second real-time location; and the map drawing unit is further configured to load, in real time according to a location change parameter generated in response to moving from the first real-time location to the second real-time location, second map data generated by the current terminal based on the current real-time location change, and pull the second map data.

In this embodiment of this application, the apparatus further includes: a monitoring unit, configured to monitor a real-time location change of the current terminal in the current region; and notify the map drawing unit in response to finding, through monitoring, that the real-time location of the current terminal moves from a first real-time location to a second real-time location; and the map drawing unit is further configured to generate third map data according to the second real-time location, and pull the third map data.

In this embodiment of this application, the apparatus further includes: a location random switching unit, configured to obtain, through division, different regions for a to-be-drawn map according to different provinces of a country in the constructed three-dimensional space, and switch the real-time location of the current terminal in the current region to a designated region in another province; and allocate, according to an upper limit requirement of terminal users of the same province, a target location randomly for the current terminal in the designated region.

In this embodiment of this application, the control unit is further configured to collect the operation triggered by the at least two terminals in the virtual space, and trigger the information exchange processing in a case that the operation meets a collision detection policy and/or a group member area collision policy; generate, according to the collision detection policy, a first operation instruction, where the first operation instruction is used for controlling the at least two terminals to perform a one-to-one interaction mode, and enter, in response to the first operation instruction, a one-to-one user session state between terminals; and generate, according to the group member area collision policy, a second operation instruction, where the second operation instruction is used for controlling the at least two terminals to perform a one-to-many interaction mode, and enter, in response to the second operation instruction, a one-to-many user group chat state between terminals.

In this embodiment of this application, the control unit is further configured to: collect the operation triggered by the at least two terminals in the virtual space, and trigger the information exchange processing in a case that the operation meets a collision detection policy and/or a group member area collision policy; and generate, according to the collision detection policy, a first operation instruction, where the first operation instruction is used for controlling the at least two terminals to perform a one-to-one interaction mode, and enter, in response to the first operation instruction, a one-to-one user session state between terminals.

In this embodiment of this application, the control unit is further configured to: collect the operation triggered by the at least two terminals in the virtual space, and trigger the information exchange processing in a case that the operation meets a collision detection policy and/or a group member area collision policy; and generate, according to the group member area collision policy, a second operation instruction, where the second operation instruction is used for controlling the at least two terminals to perform a one-to-many interaction mode, and enter, in response to the second operation instruction, a one-to-many user group chat state between terminals.

In this embodiment of this application, the apparatus further includes: a first transmission unit, configured to transmit the virtual space to the at least two terminals for displaying, where the virtual space is provided with a default viewing angle; a first receiving unit, configured to receive a viewing angle control instruction transmitted by any terminal; and a second transmission unit, configured to generate, according to the viewing angle control instruction, a corresponding virtual space, and transmit the virtual space to the terminal.

In this embodiment of this application, the apparatus further includes: a second receiving unit, configured to receive a display control instruction transmitted by any terminal; and a third transmission unit, configured to generate, according to the display control instruction, a corresponding virtual space, and transmit the virtual space to other terminals, where the display control instruction controls real-time display of the terminal on the virtual space, and the real-time display includes one of or a combination of more than one of avatar display, action display, a text identifier, and invisible display that are controllable in real time.

In this embodiment of this application, the apparatus further includes: an information control unit, configured to collect an interaction operation between any terminal and a virtual object in the virtual space, and control, according to a generated operation instruction, the information exchange processing between the terminal and the virtual object.

In this embodiment of this application, the apparatus further includes: a process monitoring unit, configured to re-initiate, in a case that any process is interrupted in real time, recovery of the process interrupted in real time, where the process includes a drawing process of the map, generation of the virtual space, and the information exchange processing of the at least two terminals.

In this embodiment of this application, the apparatus further includes: a notification unit, configured to transmit, in a case that a condition of the real-time interruption meets a notification policy, a notification to the terminal participating in the process.

In this embodiment of this application, the apparatus further includes: a first information obtaining unit, configured to obtain attribute information of the current terminal; a second information obtaining unit, configured to obtain attribute information of other terminals in the virtual space; and a space generation unit, configured to generate, according to the obtained different attribute information, virtual space matching the different attribute information.

In an embodiment, a computer device is provided, including a memory and a processor, the memory stores computer readable instructions, and the computer readable instructions, when executed by the processor, causes the processor to perform the following operations: obtaining location information of a current terminal; obtaining, according to the location information of the current terminal, map data of a range in which the current terminal is located; drawing, according to the map data, a map in a constructed three-dimensional space, to obtain a drawing result; simulating, according to the drawing result, a real environment of a geographical location of the current terminal in the three-dimensional space, to obtain a virtual space for information exchange; and collecting an operation triggered by at least two terminals in the virtual space, and controlling information exchange processing of the at least two terminals according to a generated operation instruction.

In an embodiment, in a case that the computer readable instructions are executed by the processor, and the operation of obtaining, according to the location information of the current terminal, map data of a range in which the current terminal is located is performed, the processor is further caused to perform the following operations: obtaining latitude and longitude information of the current terminal according to a positioning system, and identifying the location information of the current terminal by using the latitude and longitude information; and determining data within a preset range radiated outward by using the latitude and longitude information as a center as the map data of the range in which the current terminal is located.

In an embodiment, in a case that the computer readable instructions are executed by the processor, and the operation of drawing, according to the map data, a map in a constructed three-dimensional space, to obtain a drawing result is performed, the processor is further caused to perform the following operations: obtaining, through division, different regions in the constructed three-dimensional space for a to-be-drawn map; obtaining a real-time location of the current terminal in a current region, and pulling first map data according to the real-time location identified by the latitude and longitude information; parsing the first map data, to obtain basic-class data and auxiliary-class data, the basic-class data including first location information, and the auxiliary-class data including second location information; obtaining a first model file according to the first location information, and establishing a first model instance according to the first model file; obtaining a second model file according to the second location information, and establishing a second model instance according to the second model file; and performing map drawing of the first model instance and the second model instance in the three-dimensional space respectively according to the latitude and longitude information corresponding to the first location information, the latitude and longitude information corresponding to the second location information, basic attributes, and auxiliary identification information.

In an embodiment, the computer readable instructions further cause the processor to perform the following operations: monitoring a real-time location change of the current terminal in the current region; and loading, in real time according to a location change parameter generated in response to moving from a first real-time location to a second real-time location, second map data generated by the current terminal based on the current real-time location change, and pulling the second map data, in response to finding, through monitoring, that the real-time location of the current terminal moves from the first real-time location to the second real-time location.

In an embodiment, the computer readable instructions further cause the processor to perform the following operations: monitoring a real-time location change of the current terminal in the current region; and generating third map data according to a second real-time location, and pulling the third map data in response to finding, through monitoring, that the real-time location of the current terminal moves from a first real-time location to the second real-time location.

In an embodiment, the computer readable instructions further cause the processor to perform the following operations: obtaining, through division, different regions in the constructed three-dimensional space; switching a real-time location of the current terminal in the current region to another designated region; and allocating, according to an upper limit requirement of terminal users in the same region, a target location randomly for the current terminal in the designated region.

In an embodiment, in a case that the computer readable instructions are executed by the processor, and the operation of collecting an operation triggered by at least two terminals in the virtual space, and controlling information exchange processing of the at least two terminals according to a generated operation instruction is performed, the processor is caused to perform the following operations: collecting the operation triggered by the at least two terminals in the virtual space, and triggering the information exchange processing in a case that the operation meets a collision detection policy and/or a group member area collision policy; and generating, according to the collision detection policy, a first operation instruction, the first operation instruction being used for controlling the at least two terminals to perform a one-to-one interaction mode, and enter, in response to the first operation instruction, a one-to-one user session state between terminals.

In an embodiment, in a case that the computer readable instructions are executed by the processor, and the operation of collecting an operation triggered by at least two terminals in the virtual space, and controlling information exchange processing of the at least two terminals according to a generated operation instruction is performed, the processor is caused to perform the following operations: collecting the operation triggered by the at least two terminals in the virtual space, and triggering the information exchange processing in a case that the operation meets a collision detection policy and/or a group member area collision policy; and generating, according to the group member area collision policy, a second operation instruction, the second operation instruction being used for controlling the at least two terminals to perform a one-to-many interaction mode, and enter, in response to the second operation instruction, a one-to-many user group chat state between terminals.

In an embodiment, the computer readable instructions further cause the processor to perform the following operations: transmitting the virtual space to the at least two terminals for displaying, the virtual space being provided with a default viewing angle; receiving a viewing angle control instruction transmitted by any terminal; and generating, according to the viewing angle control instruction, a corresponding virtual space, and transmitting the corresponding virtual space to the terminal.

In an embodiment, the computer readable instructions further cause the processor to perform the following operations: receiving a display control instruction transmitted by any terminal; and generating, according to the display control instruction, a corresponding virtual space, and transmitting the corresponding virtual space to other terminals, where the display control instruction controls real-time display of the terminal on the virtual space, and the real-time display includes one of or a combination of more than one of avatar display, action display, a text identifier, and invisible display that are controllable in real time.

In an embodiment, the computer readable instructions further cause the processor to perform the following operations: collecting an interaction operation between any terminal and a virtual object in the virtual space, and controlling, according to a generated operation instruction, the information exchange processing between the terminal and the virtual object.

In an embodiment, the computer readable instructions further cause the processor to perform the following operations: re-initiating, in a case that any process is interrupted in real time, recovery of the process interrupted in real time, the process including a drawing process of the map, generation of the virtual space, and the information exchange processing of the at least two terminals.

In an embodiment, the computer readable instructions further cause the processor to perform the following operations: transmitting, in a case that a condition of the real-time interruption meets a notification policy, a notification to the terminal participating in the process.

In an embodiment, the computer readable instructions further cause the processor to perform the following operations: obtaining attribute information of the current terminal; obtaining attribute information of other terminals in the virtual space; and generating, according to the obtained different attribute information, a virtual space matching the different attribute information.

A non-volatile computer readable storage medium storing computer readable instructions is provided, the computer readable instructions, when executed by one or more processors, causing the one or more processors to perform the following operations: obtaining location information of a current terminal; obtaining, according to the location information of the current terminal, map data of a range in which the current terminal is located; drawing, according to the map data, a map in a constructed three-dimensional space, to obtain a drawing result; simulating, according to the drawing result, a real environment of a geographical location of the current terminal in the three-dimensional space, to obtain a virtual space for information exchange; and collecting an operation triggered by at least two terminals in the virtual space, and controlling information exchange processing of the at least two terminals according to a generated operation instruction.

In an embodiment, in a case that the computer readable instructions are executed by the processor, and the operation of obtaining, according to the location information of the current terminal, map data of a range in which the current terminal is located is performed, the processor is further caused to perform the following operations: obtaining latitude and longitude information of the current terminal according to a positioning system, and identifying the location information of the current terminal by using the latitude and longitude information; and determining data within a preset range radiated outward by using the latitude and longitude information as a center as the map data of the range in which the current terminal is located.

In an embodiment, in a case that the computer readable instructions are executed by the processor, and the operation of drawing, according to the map data, a map in a constructed three-dimensional space, to obtain a drawing result is performed, the processor is further caused to perform the following operations: obtaining, through division, different regions in the constructed three-dimensional space for a to-be-drawn map; obtaining a real-time location of the current terminal in a current region, and pulling first map data according to the real-time location identified by the latitude and longitude information; parsing the first map data, to obtain basic-class data and auxiliary-class data, the basic-class data including first location information, and the auxiliary-class data including second location information; obtaining a first model file according to the first location information, and establishing a first model instance according to the first model file; obtaining a second model file according to the second location information, and establishing a second model instance according to the second model file; and performing map drawing of the first model instance and the second model instance in the three-dimensional space respectively according to the latitude and longitude information corresponding to the first location information, the latitude and longitude information corresponding to the second location information, basic attributes, and auxiliary identification information.

In an embodiment, the computer readable instructions further cause the processor to perform the following operations: monitoring a real-time location change of the current terminal in the current region; and loading, in real time according to a location change parameter generated in response to moving from a first real-time location to a second real-time location, second map data generated by the current terminal based on the current real-time location change, and pulling the second map data, in response to finding, through monitoring, that the real-time location of the current terminal moves from the first real-time location to the second real-time location.

In an embodiment, the computer readable instructions further cause the processor to perform the following operations: monitoring a real-time location change of the current terminal in the current region; and generating third map data according to a second real-time location, and pulling the third map data in response to finding, through monitoring, that the real-time location of the current terminal moves from a first real-time location to the second real-time location.

In an embodiment, the computer readable instructions further cause the processor to perform the following operations: obtaining, through division, different regions in the constructed three-dimensional space; switching a real-time location of the current terminal in the current region to another designated region; and allocating, according to an upper limit requirement of terminal users in the same region, a target location randomly for the current terminal in the designated region.

In an embodiment, in a case that the computer readable instructions are executed by the processor, and the operation of collecting an operation triggered by at least two terminals in the virtual space, and controlling information exchange processing of the at least two terminals according to a generated operation instruction is performed, the processor is caused to perform the following operations: collecting the operation triggered by the at least two terminals in the virtual space, and triggering the information exchange processing in a case that the operation meets a collision detection policy and/or a group member area collision policy; and generating, according to the collision detection policy, a first operation instruction, the first operation instruction being used for controlling the at least two terminals to perform a one-to-one interaction mode, and enter, in response to the first operation instruction, a one-to-one user session state between terminals.

In an embodiment, in a case that the computer readable instructions are executed by the processor, and the operation of collecting an operation triggered by at least two terminals in the virtual space, and controlling information exchange processing of the at least two terminals according to a generated operation instruction is performed, the processor is caused to perform the following operations: collecting the operation triggered by the at least two terminals in the virtual space, and triggering the information exchange processing in a case that the operation meets a collision detection policy and/or a group member area collision policy; and generating, according to the group member area collision policy, a second operation instruction, the second operation instruction being used for controlling the at least two terminals to perform a one-to-many interaction mode, and enter, in response to the second operation instruction, a one-to-many user group chat state between terminals.

In an embodiment, the computer readable instructions further cause the processor to perform the following operations: transmitting the virtual space to the at least two terminals for displaying, the virtual space being provided with a default viewing angle; receiving a viewing angle control instruction transmitted by any terminal; and generating, according to the viewing angle control instruction, a corresponding virtual space, and transmitting the corresponding virtual space to the terminal.

In an embodiment, the computer readable instructions further cause the processor to perform the following operations: receiving a display control instruction transmitted by any terminal; and generating, according to the display control instruction, a corresponding virtual space, and transmitting the corresponding virtual space to other terminals, where the display control instruction controls real-time display of the terminal on the virtual space, and the real-time display includes one of or a combination of more than one of avatar display, action display, a text identifier, and invisible display that are controllable in real time.

In an embodiment, the computer readable instructions further cause the processor to perform the following operations: collecting an interaction operation between any terminal and a virtual object in the virtual space, and controlling, according to a generated operation instruction, the information exchange processing between the terminal and the virtual object.

In an embodiment, the computer readable instructions further cause the processor to perform the following operations: re-initiating, in a case that any process is interrupted in real time, recovery of the process interrupted in real time, the process including a drawing process of the map, generation of the virtual space, and the information exchange processing of the at least two terminals.

In an embodiment, the computer readable instructions further cause the processor to perform the following operations: transmitting, in a case that a condition of the real-time interruption meets a notification policy, a notification to the terminal participating in the process.

In an embodiment, the computer readable instructions further cause the processor to perform the following operations: obtaining attribute information of the current terminal; obtaining attribute information of other terminals in the virtual space; and generating, according to the obtained different attribute information, a virtual space matching the different attribute information.

Figure 10:
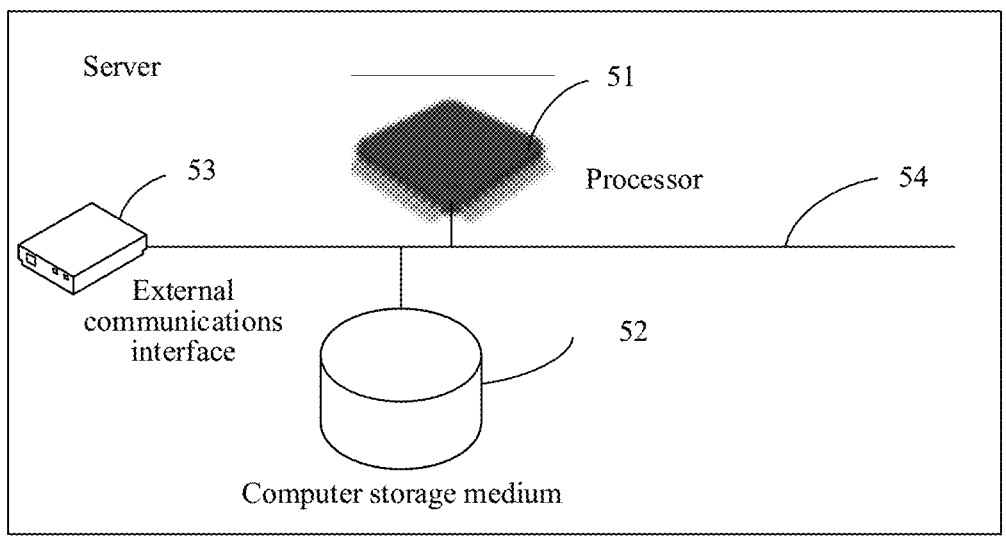
FIG. 10 is a schematic diagram of hardware entities of a server according to an embodiment of this application.

As shown in FIG. 10, in a case that a computer storage medium is located in a server. As a hardware entity, the server includes a processor 51, a computer storage medium 52, and at least one external communications interface 53; the processor 51, the computer storage medium 52, and the external communications interface 53 are connected to each other by using a bus 54. The memory includes a non-volatile storage medium and an internal memory. The non-volatile storage medium of the computer device stores an operating system, and may further store computer readable instructions. The computer readable instructions, when executed by the processor, may cause the processor to implement an information exchange method based on a virtual space scene. The internal memory may also store computer readable instructions. The computer readable instructions, when executed by the processor, may cause the processor to implement an information exchange method based on a virtual space scene.

The descriptions related to the terminal and the server are similar to the descriptions of the foregoing method. The descriptions of beneficial effects of the terminal and the server are the same as that of the method, and details are not described again. For technical details of the terminal and the server that are not disclosed in this application, refer to the content described in the embodiments of the method procedures in this application.

In the several embodiments provided in this application, it is to be understood that the disclosed device and method may be implemented in other manners. The described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of this application may be integrated into one processing unit, or each of the units may exist alone physically, or two or more units may be integrated into one unit. The integrated unit may be implemented in the form of hardware, or may be implemented in the form of hardware and a software functional unit.

A person of ordinary skill in the art may understand that, some or all of the steps in the foregoing method embodiments may be implemented by using program instruction relevant hardware. The program may be stored in a computer readable storage medium. When the program is executed, steps including the method embodiments are performed. However, the storage medium includes various types of media that can store program code, for example, a mobile storage device, a read-only memory (ROM), a random access memory (RAM), a magnetic disk, or an optical disc.

Alternatively, when the integrated unit of this application is implemented in a form of a software functional unit and sold or used as an independent product, the integrated unit may be stored in a computer-readable storage medium. Based on such an understanding, the technical solutions of the embodiments of this application essentially, or the part contributing to the related art may be implemented in a form of a software product. The computer software product is stored in a storage medium and includes several instructions for instructing a computer device (which may be a personal computer, a server, a network device, or the like) to perform all or some of the methods described in the embodiments of this application. The foregoing storage medium includes: any media that can store program code, such as a removable storage device, a ROM, a RAM, a magnetic disk, or an optical disc.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of the present application shall be subject to the appended claims.

What is claimed is:

1. An information exchange method based on a virtual space scene, executed on a computing device having one or more processors and memory storing a plurality of programs to be executed by the one or more processors, and the method comprising:
   obtaining location information of a current terminal;
   obtaining, according to the location information of the current terminal, map data of a range in which the current terminal is located;
   presetting a set of reusable models according to an information type of the map data;
   drawing, according to the map data, a map in a constructed three-dimensional space, to obtain a drawing result;
   modifying, according to sizes and locations identified on the map data, the set of reusable preset models to obtain a modification of the reusable preset models;
   simulating, according to the drawing result and the modification of the set of reusable preset models, a real environment of a geographical location of the current terminal in the three-dimensional space, to obtain a virtual space for information exchange; and
   collecting an operation triggered by at least two avatars corresponding to two terminals in the virtual space, and controlling information exchange of the at least two avatars according to a generated operation instruction,
   wherein a respective reusable preset model of the set of reusable preset models represents a respective type of structure on the map, and the respective reusable preset model is reused multiple times and modified each time according to a size and a location identified on the map data.

2. The method according to claim 1, wherein the obtaining, according to the location information of the current terminal, map data of a range in which the current terminal is located comprises:
   obtaining latitude and longitude information of the current terminal according to a positioning system, and identifying the location information of the current terminal by using the latitude and longitude information; and
   determining data within a preset range radiated outward by using the latitude and longitude information as a center as the map data of the range in which the current terminal is located.

3. The method according to claim 1, wherein the drawing, according to the map data, a map in a constructed three-dimensional space, to obtain a drawing result comprises:
   obtaining, through division, different regions in the constructed three-dimensional space for a to-be-drawn map;
   obtaining a real-time location of the current terminal in a current region, and pulling first map data according to the real-time location identified by latitude and longitude information;
   parsing the first map data, to obtain basic-class data and auxiliary-class data, the basic-class data comprising first location information, and the auxiliary-class data comprising second location information;
   obtaining a first model file according to the first location information, and establishing a first model instance according to the first model file;
   obtaining a second model file according to the second location information, and establishing a second model instance according to the second model file; and
   performing map drawing of the first model instance and the second model instance in the three-dimensional space respectively according to the latitude and longitude information corresponding to the first location information, the latitude and longitude information corresponding to the second location information, basic attributes, and auxiliary identification information.

4. The method according to claim 3, wherein the method further comprises:
   monitoring a real-time location change of the current terminal in the current region; and loading, in real time according to a location change parameter generated in response to moving from a first real-time location to a second real-time location, second map data generated by the current terminal based on the current real-time location change, and pulling the second map data, in response to finding, through monitoring, that the real-time location of the current terminal moves from the first real-time location to the second real-time location.

5. The method according to claim 3, wherein the method further comprises:
monitoring a real-time location change of the current terminal in the current region; and
generating third map data according to a second real-time location, and pulling the third map data in response to finding, through monitoring, that the real-time location of the current terminal moves from a first real-time location to the second real-time location.

6. The method according to claim 1, wherein the method further comprises:
obtaining, through division, different regions in the constructed three-dimensional space;
switching a real-time location of the current terminal in the current region to another designated region; and
allocating, according to an upper limit requirement of terminal users in the same region, a target location randomly for the current terminal in the designated region.

7. The method according to claim 1, wherein the collecting an operation triggered by at least two avatars corresponding to two terminals in the virtual space, and controlling information exchange processing of the at least two avatars according to a generated operation instruction comprises:
collecting the operation triggered by the at least two avatars corresponding to two terminals in the virtual space, and triggering the information exchange processing in a case that the operation meets a collision detection policy and/or a group member area collision policy; and
generating, according to the collision detection policy, a first operation instruction, the first operation instruction being used for controlling the at least two avatars to perform a one-to-one interaction mode, and enter, in response to the first operation instruction, a one-to-one user session state between avatars.

8. The method according to claim 1, wherein the collecting an operation triggered by at least two avatars corresponding to two terminals in the virtual space, and controlling information exchange processing of the at least two avatars according to a generated operation instruction comprises:
collecting the operation triggered by the at least two avatars corresponding to two terminals in the virtual space, and triggering the information exchange processing in a case that the operation meets a collision detection policy and/or a group member area collision policy; and generating, according to the group member area collision policy, a second operation instruction, the second operation instruction being used for controlling the at least two avatars to perform a one-to-many interaction mode, and enter, in response to the second operation instruction, a one-to-many user group chat state between avatars.

9. The method according to claim 1, wherein the method further comprises:

transmitting the virtual space to the at least two terminals for displaying, the virtual space being provided with a default viewing angle;
receiving a viewing angle control instruction transmitted by any terminal; and
generating, according to the viewing angle control instruction, a corresponding virtual space, and transmitting the corresponding virtual space to the terminal.

10. The method according to claim 1, wherein the method further comprises:
receiving a display control instruction transmitted by any terminal; and
generating, according to the display control instruction, a corresponding virtual space, and transmitting the corresponding virtual space to other terminals, wherein the display control instruction controls real-time display of the terminal on the virtual space, and the real-time display comprises one of or a combination of more than one of avatar display, action display, a text identifier, and invisible display that are controllable in real time.

11. The method according to claim 1, wherein the method further comprises:
collecting an interaction operation between any terminal and a virtual object in the virtual space, and controlling, according to a generated operation instruction, the information exchange processing between the terminal and the virtual object.

12. The method according to claim 1, wherein the method further comprises:
re-initiating, in a case that any process is interrupted in real time, recovery of the process interrupted in real time, the process comprising a drawing process of the map, generation of the virtual space, and the information exchange processing of the at least two terminals.

13. The method according to claim 12, wherein the method further comprises:
transmitting, in a case that a condition of the real-time interruption meets a notification policy, a notification to the terminal participating in the process.

14. The method according to claim 1, wherein the method further comprises:
obtaining attribute information of the current terminal;
obtaining attribute information of other terminals in the virtual space; and
generating, according to the obtained different attribute information, a virtual space matching the different attribute information.

15. A computing device comprising one or more processors, memory coupled to the one or more processors and a plurality of programs stored in the memory that, when executed by the one or more processors, cause the computing device to perform a plurality of operations comprising:
obtaining location information of a current terminal;
obtaining, according to the location information of the current terminal, map data of a range in which the current terminal is located;
presetting a set of reusable models according to an information type of the map data;
drawing, according to the map data, a map in a constructed three-dimensional space, to obtain a drawing result;
modifying, according to sizes and locations identified on the map data, the set of reusable preset models to obtain a modification of the reusable preset models;
simulating, according to the drawing result and the modification of the set of reusable preset models, a real environment of a geographical location of the current terminal in the three-dimensional space, to obtain a virtual space for information exchange; and collecting an operation triggered by at least two avatars corresponding to two terminals in the virtual space, and controlling information exchange of the at least two avatars according to a generated operation instruction, wherein a respective reusable preset model of the set of reusable preset models represents a respective type of structure on the map, and the respective reusable preset model is reused multiple times and modified each time according to a size and a location identified on the map data.

16. The computing device according to claim 15, wherein the obtaining, according to the location information of the current terminal, map data of a range in which the current terminal is located comprises:

obtaining latitude and longitude information of the current terminal according to a positioning system, and identifying the location information of the current terminal by using the latitude and longitude information; and determining data within a preset range radiated outward by using the latitude and longitude information as a center as the map data of the range in which the current terminal is located.

17. The computing device according to claim 15, wherein the drawing, according to the map data, a map in a constructed three-dimensional space, to obtain a drawing result comprises:

obtaining, through division, different regions in the constructed three-dimensional space for a to-be-drawn map;

obtaining a real-time location of the current terminal in a current region, and pulling first map data according to the real-time location identified by latitude and longitude information;

parsing the first map data, to obtain basic-class data and auxiliary-class data, the basic-class data comprising first location information, and the auxiliary-class data comprising second location information;

obtaining a first model file according to the first location information, and establishing a first model instance according to the first model file;

obtaining a second model file according to the second location information, and establishing a second model instance according to the second model file; and performing map drawing of the first model instance and the second model instance in the three-dimensional space respectively according to the latitude and longitude information corresponding to the first location information, the latitude and longitude information corresponding to the second location information, basic attributes, and auxiliary identification information.

18. The computing device according to claim 15, wherein the plurality of operations further comprise:

transmitting the virtual space to the at least two terminals for displaying, the virtual space being provided with a default viewing angle;

receiving a viewing angle control instruction transmitted by any terminal; and generating, according to the viewing angle control instruction, a corresponding virtual space, and transmitting the corresponding virtual space to the terminal.

19. The computing device according to claim 15, wherein the plurality of operations further comprise:

receiving a display control instruction transmitted by any terminal; and generating, according to the display control instruction, a corresponding virtual space, and transmitting the corresponding virtual space to other terminals, wherein the display control instruction controls real-time display of the terminal on the virtual space, and the real-time display comprises one of or a combination of more than one of avatar display, action display, a text identifier, and invisible display that are controllable in real time.

20. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

obtaining location information of a current terminal;

obtaining, according to the location information of the current terminal, map data of a range in which the current terminal is located;

presetting a set of reusable models according to an information type of the map data;

drawing, according to the map data, a map in a constructed three-dimensional space, to obtain a drawing result;

modifying, according to sizes and locations identified on the map data, the set of reusable preset models to obtain a modification of the reusable preset models;

simulating, according to the drawing result and the modification of the set of reusable preset models, a real environment of a geographical location of the current terminal in the three-dimensional space, to obtain a virtual space for information exchange; and collecting an operation triggered by at least two avatars corresponding to two terminals in the virtual space, and controlling information exchange of the at least two avatars according to a generated operation instruction, wherein a respective reusable preset model of the set of reusable preset models represents a respective type of structure on the map, and the respective reusable preset model is reused multiple times and modified each time according to a size and a location identified on the map data.

* * * * *